Dec. 19, 1950  F. A. THAHELD  2,534,322
METHOD OF OPERATING DIESEL TYPE
INTERNAL-COMBUSTION ENGINES
Filed Nov. 22, 1949  2 Sheets-Sheet 1
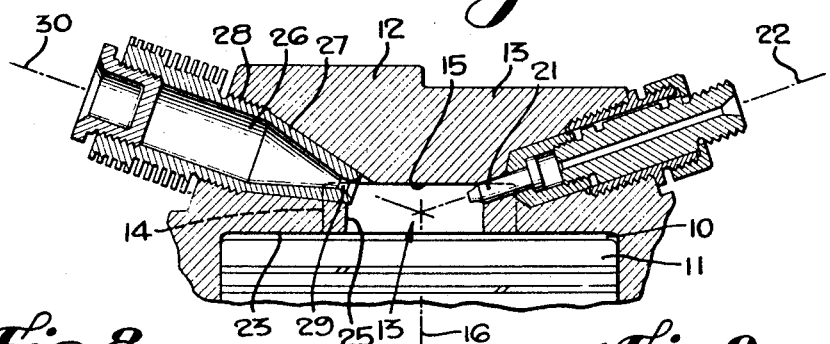
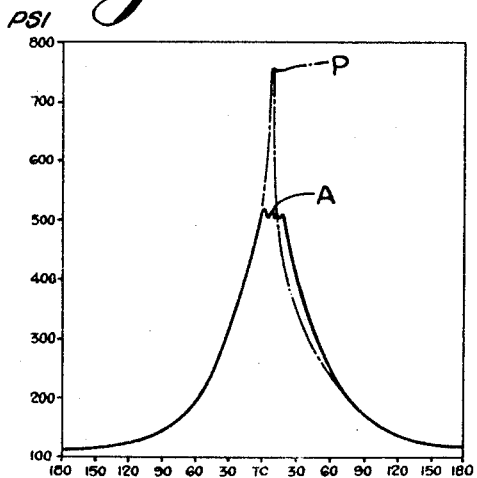
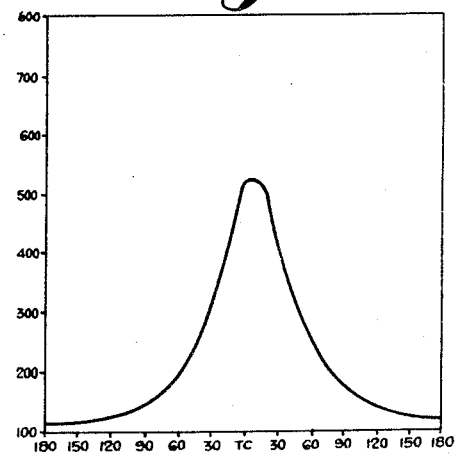
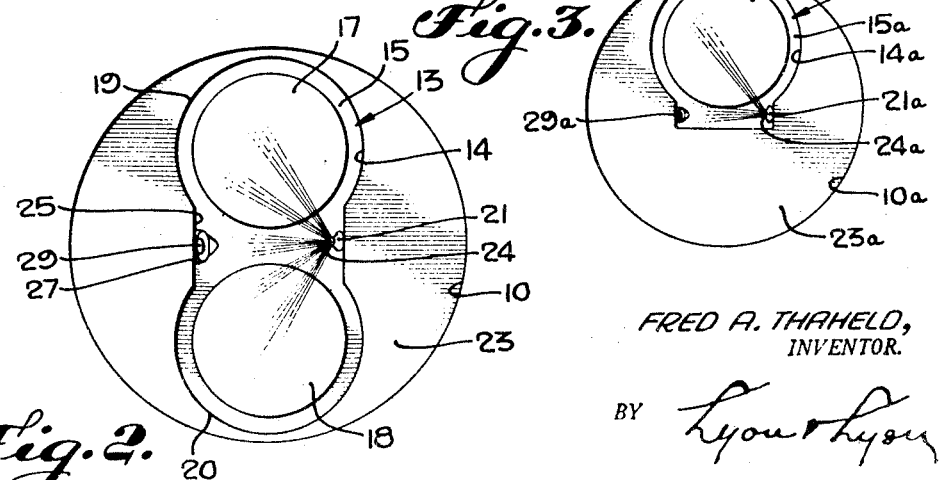
FRED A. THAHELD,
INVENTOR.
BY Lyon & Lyon
ATTORNEYS

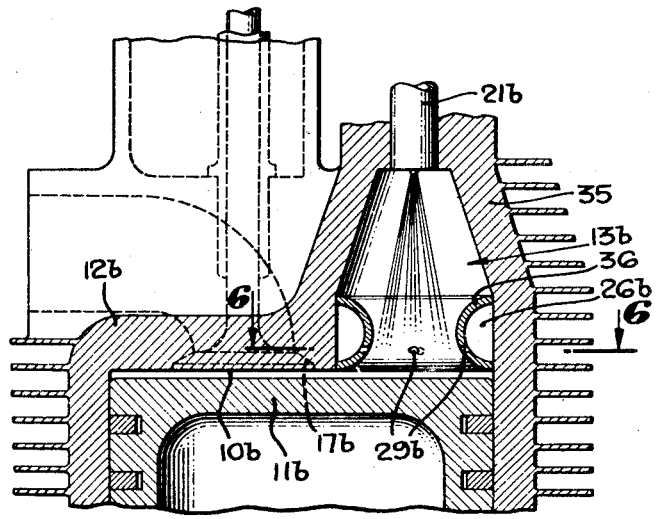
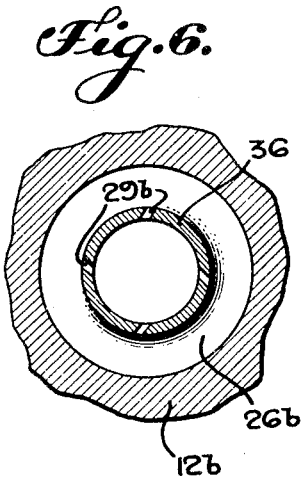
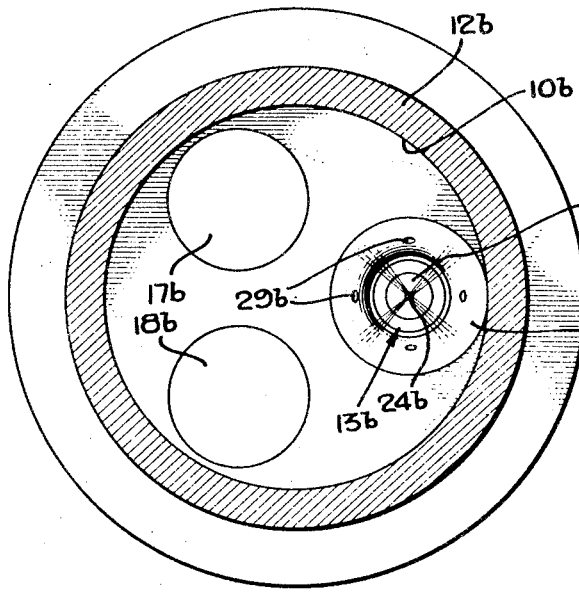
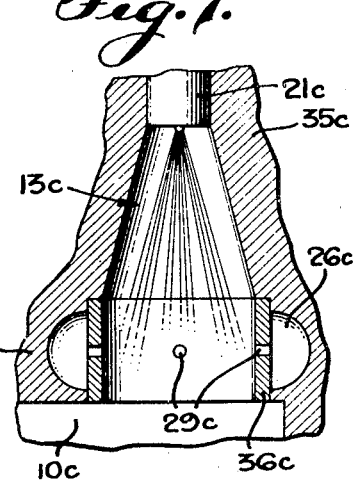

Patented Dec. 19, 1950

2,534,322

UNITED STATES PATENT OFFICE 2,534,322

METHOD OF OPERATING DIESEL-TYPE INTERNAL-COMBUSTION ENGINES

Fred. A. Thaheld, Brea, Calif., assignor to Diesel Power, Inc., Los Angeles, Calif., a corporation of Pennsylvania Application November 22, 1949, Serial No. 128,691

1 Claim. (Cl. 123—32)

This invention relates to a combustion chamber of the type used in fuel burning engines and is particularly directed to an improved means for progressive burning of a fuel by a series of rapid, relatively small detonations in order to avoid a single heavy detonation during combustion of the fuel. This invention finds usefulness as applied to the combustion chamber of a solid injection engine of the Diesel type.

The principal object of this invention is to provide a combustion chamber for progressive burning of a fuel in a series of rapid pulsations.

Another object of this invention is to provide a novel form of combustion chamber for use in connection with a solid injection-type engine and in which maximum fuel economy is obtained.

Another object is to provide a combustion chamber for an engine of this type which provides a smooth application of power to the piston by avoiding objectionably high peak pressures.

Another object is to provide a combustion chamber of this type which is applicable to large bore short stroke engines, as well as to small bore long stroke engines.

In broad terms I seek to accomplish smooth application of power by progressively burning a fuel in a series of relatively small rapid detonations. This purpose I accomplish by injecting a solid stream of fuel made up largely of relatively coarse droplets into the main combustion chamber. The finer droplets of atomized fuel forming the minor portion of the injected fuel charge ignite by compression first, and the resulting turbulence causes ignition of additional atomized fuel particles. This initial phase of the combustion takes place when the piston is near top center position and subsequent downward movement of the piston permits expansion of the gases in the combustion chamber so that pressure in the main combustion chamber is in fact slightly lowered. Previously compressed air in the auxiliary air chamber flows rapidly from an auxiliary chamber or air seal, causing additional turbulence and intimate mixing of the unburned fuel. In turn, this effects a substantial increase in the rate of combustion in the main chamber and the consequent sudden build-up of pressure causes reverse flow of gases from the main chamber into the auxiliary chamber or air cell. The return flow of gases carries some unburned fuel into the air cell which ignites there under compression and causes a second blast of compressed air and combustion products to be directed into the main chamber. This second jet again creates additional turbulence and supplies more oxygen for combustion, which in turn raises the combustion rate and produces a second sudden pressure rise. The combustion, therefore, does not proceed uniformly, but on the contrary is composed of a series of interacting detonations between the main chamber and the auxiliary chamber or air cell which continue until the entire fuel charge has been consumed.

A preferred form of construction for accomplishing this mode of operation is shown in the accompanying drawings in which:

Figure 1 is a sectional view through the upper portion of the cylinder of a solid injection-type engine showing a preferred form of combustion chamber and its associated parts.

Figure 2 is an underneath view of the device shown in Figure 1.

Figure 3 is a view similar to Figure 2 showing a modified form of my invention.

Figure 4 is a view similar to Figure 1 showing a modified form of engine embodying my invention.

Figure 5 is an underneath view of the apparatus shown in Figure 3, the piston being omitted.

Figure 6 is a sectional view taken substantially on the lines 6—6 as shown in Figure 4.

Figure 7 is a sectional view partly broken away similar to Figure 4 and showing a further modified form of my invention.

Figure 8 is a diagram showing a typical time pressure curve for a conventional engine and a typical time pressure curve for an engine embodying my invention.

Figure 9 is a diagram similar to Figure 8 showing a time pressure curve for a conventional engine and for an engine embodying this invention when no fuel for combustion is introduced. The diagram represents the compression curve only.

This application is a continuation-in-part of my copending application, Serial No. 639,717, filed January 8, 1946, for "Combustion Chamber," now abandoned.

The cylinder 10 receives the piston 11 which is shown in its top dead center position. In the head 12 of the engine above the cylinder 10 and opening into the cylinder 10 is a double lobe-shaped combustion chamber 13 having side walls 14 defining a substantially figure-8 shaped section and an end wall 15 lying in a plane perpendicular to the axis 16 of the cylinder 10. The combustion chamber 13 extends transversely over substantially the entire area of the piston 11 and encircles the ports (not shown) closed by the inlet valve 17 and the exhaust valve 18. Mounted symmetrically between the lobes 19 and 20 and projecting into the combustion chamber 13 is a conventional form of injector nozzle 21. The nozzle 21 is mounted on an axis 22 intersecting the axis 16 of the cylinder 10 at a point substantially midway from the wall 23 of the cylinder 10 to the end wall 15 of the combustion chamber 13.

The point of intersection of the axis 22 with the cylinder axis 16 is preferably made as close to the mid-point between the walls 23 and 15 as is practicable, but satisfactory results may be obtained if the point of intersection occurs at the mid-point or at any other location between such mid-point and the intersection of the chamber 13 with the cylinder 10. The nozzle 21 may employ a plurality of discharge orifices 24 arranged to inject solid streams of fuel diverging from the nozzle 21 and having their main force in a direction to pass across the centers of the lobes 19 and 20. A center stream from the nozzle 21 is directed along the axis 22 to impinge upon the side wall 25 of the chamber 13 directly opposite the nozzle 21. Conventional means (not shown) are provided for injecting fuel into the nozzle 21 at high pressure.

Mounted diametrically opposite to the nozzle 21 and arranged symmetrically of the lobes 19 and 20 is an auxiliary chamber 26 enclosed within a housing 27 secured to the head 12 by threads 28. The housing 27 is reduced in cross-section toward its inner end to define a restricted orifice 29 at the point where the auxiliary chamber 26 communicates with the combustion chamber 13. Like the injection nozzle 21, the housing 27 is mounted within the head 12 so that its axis of symmetry 30 intersects the axis of the cylinder 16 at a point approximately midway between the walls 23 and 15. The respective inclinations of the housing 27 and the nozzle 21 are dependent to a certain extent upon the compression ratio selected for the particular engine. In the arrangement illustrated in the drawings, the compression ratio is assumed to be 16:1. It is known that satisfactory operation can be obtained with compression ratios ranging from 12:1 to 20:1. I have found that a 16:1 compression ratio gives high operating efficiency and also permits easy starting.

I have found from experiment that the size of the auxiliary chamber 26 should be from 10 to 50% of the total volume of the compressed air when the piston is in its top dead center position. The relative positions of the auxiliary chamber or air cell 26 and the injection nozzle 21 can be varied considerably so long as the injector does not send a solid slug of fuel into the interior of the air cell or auxiliary chamber 26. It is important that the initial combustion commence in the main combustion chamber, and that the only unburned fuel entering the air cell 26 shall do so after the initial pressure rise has occurred in the main chamber 13.

In the operation of the apparatus described, as the piston 10 approaches its upper dead center position an injection of fuel is initiated through the nozzle 21 and continues until the piston has moved downwardly in its power stroke. The fuel is injected in solid streams diverging outwardly from the nozzle orifices 24. The core of the ejected streams is relatively solid fuel and with very little mixing of air, whereas the outer fringes of the streams are highly atomized and mix immediately with the air in the combustion chamber 13. Ignition first occurs in these atomized particles and the resulting turbulence breaks up the larger fuel globules for more intimate mixing. Fuel is injected into the combustion chamber in a rather coarse state but in such manner as to be substantially evenly distributed throughout the entire confines of the chamber without direct injection of any of the fuel into the auxiliary cell. Injection of the fuel is completed at about the same time the piston reaches top dead center so that combustion commences at that time. The stream of fuel injected is made up largely of relatively coarse droplets, and only a minor percentage of the fuel is finely atomized, and consequently burning of the fuel at the start is quite slow and occurs about the time that the piston starts its downward stroke. The downward stroke of the piston permits expansion of the gases in the combustion chamber at a rate somewhat greater than that due to combustion alone so that the pressure in the main combustion chamber is, in fact, lowered slightly. Upon this lowering of the pressure in the chamber, compressed air in the cell 26 expands and shoots out in jet form from the restriction 29 into the combustion chamber. The jet is so directed as to cause maximum turbulence of the gases in the combustion chamber, thus more intimately mixing unburned fuel and oxygen therein and also supplying and mixing additional oxygen from the cell 26 with the gases in the chamber. This turbulence and added oxygen causes a substantial increase in the rate of combustion in the main chamber which produces a sudden spurt of pressure sufficiently high to cause reverse flow of gases into the cell 26. The gases now moving into cell 26 include some unburned fuel. When the unburned fuel enters the cell 26, in which there is an excess of oxygen, compression ignition again takes place and high pressure is developed in the cell. By this time the piston will have moved downwardly enough to again relieve the pressure in the combustion chamber to a point below that in the cell 26 and the pressure therein, caused by the combustion therein just described, produces a second jet from the cell into the combustion chamber to again thoroughly mix the gases therein and add new oxygen thereto, thus commencing a repetition of the cycle previously described.

The above description of the detailed steps in the cycle of operation corresponds primarily to engine operation at loads up to full rated horsepower output. Under such conditions the amount of fuel injected for each power stroke is less than the maximum amount which can be injected and the time of injection is relatively late in the operative power stroke of the piston. Under conventional practice, to increase the power output of the engine the size of the slug of fuel injected is increased and the timing of the injection is set to occur earlier in the stroke of the piston. Accordingly, overload conditions may require that a maximum size slug of fuel be injected before the piston reaches top center position. In this event a first pressure rise occurs in the main chamber as a result of combustion initiating there, and accordingly, the first movement of gases between the main chamber and air cell may occur inwardly into the air cell. Subsequent combustion of fuel particles within the air cell causes a pressure rise which initiates the first blast of gases from the air cell into the main chamber. The next pressure rise occurs in the main chamber, as set forth above, and the series of interacting detonations continues as previously described.

The structural relationships between the injector 21, air cell 26 and main chamber 13 are such that the injector nozzle distributes fuel substantially uniformly throughout the main chamber, and the jet-like discharge of expanding gases from the cell 26 should be directed into the chamber 13 in such a manner as to produce the most efficient turbulence therein.

This mode of operation constitutes a control of the combustion of fuel in the engine resulting in more complete combustion and the avoidance of shock loads on the pistons and bearings. The graph lines shown in Figure 9 illustrate a typical compression curve in a Diesel engine when no fuel is injected during the cycle. This curve represents the pressure in the main chamber in either a conventional engine or in an engine embodying my invention when no fuel is injected. As shown in Figure 8, however, the injection of fuel in a conventional engine as indicated by the dashed line produces a characteristically high peak of pressure indicated by the letter P. On the other hand, the effect of injection of fuel into the main chamber in an engine embodying my invention is shown by the wavy line A which represents the series of interacting pulsations between the main chamber and the air cell. It will be observed that the combustion pressure in my improved combustion chamber does not exceed the highest value of pressure shown by the compression curve in Figure 9. In other words, the pressure of combustion lacks the characteristic high peak, and in fact is no greater than the compression of the air when no fuel is introduced.

The modification illustrated in Figure 3 of the drawings embodies a single lobe 19a instead of the double lobe construction described above. The numerals applied to Figure 3 are similar to those previously used but the suffix "a" has been added in each case. The method of operation employed in this modified form of my invention is similar in all respects to that described for the double lobe arrangement shown in Figure 2.

In the modified form of my invention shown in Figures 4, 5 and 6, the numerals are similar to those previously used but the suffix "b" has been added in each case. The cylinder head 12b is shaped closely to conform to the upper surface of the piston 11b when the latter is in its top center position. The main combustion chamber 13 extends into a space 13b provided within walls 35 of the cylinder head 12b. The injector 21b is positioned at the upper end of walls 35 and is arranged to direct several jets of solid fuel downwardly and outwardly through the space 13b. An auxiliary combustion chamber or air cell 26b is provided by the metallic insert 36 which is toroidal in shape. Ports 29b interconnect the auxiliary chamber 26b with the main chamber 13b. The individual jets from the injector nozzle 21b are aimed so they do not impinge directly on the ports 29b, and therefore no solid fuel is injected directly into the air cell 26b.

In the further modification shown in Figure 7 the shape and construction of the air cell is changed somewhat but the method of operation remains unchanged. In this form of my invention the air cell 26c is formed as an annulus in the cylinder head 12c and a cylindrical insert 36c forms the inner wall of the air cell. Ports 29c provide communication from the air cell 26c to the main combustion chamber 13c. The jets from the injector nozzle 21c are preferably arranged so that they do not impinge directly on the ports 29c.

The method of operation of the forms of my invention shown in Figures 4 to 6 and in Figure 7 are substantially identical to that described in detail above.

It is recognized that it is even possible to employ a construction in which the fuel jets from the injector nozzle are aimed directly into a port communicating with the air cell. In such a construction, however, the timing of the injection of the fuel slug must be set to a curve on the down stroke of the piston so that the fuel slug is ignited and consumed before any substantial part thereof enters the air cell. In this way the combustion is initiated in the main combustion chamber followed by expansion of compressed air from the air cell into the air chamber. The resulting turbulence and addition of oxygen raises the combustion rate in the main chamber so that a rapid rise in pressure occurs to force a flow of gases and unburned fuel back into the air cell. The interacting detonations characteristic of my invention then occur between the air cell and main combustion chamber so that the high pressure peak characteristic of conventional Diesel engines is avoided.

Having fully described my invention, it is to be understood that I do not wish to be limited to the details herein set forth, but my invention is of the full scope of the appended claim.

I claim:

The method of operating a Diesel engine having a combustion chamber defined by a cylinder and a reciprocable piston therein and an auxiliary chamber communicating with said combustion chamber through a restricted passageway, comprising the steps of: compressing a charge of air in said chambers to ignition temperature by moving said piston in one direction, injecting coarse fuel throughout said combustion chamber at the completion of said piston movement to initiate combustion of said fuel, directing said injected fuel to prevent projection thereof into said auxiliary chamber, immediately moving said piston in the other direction at a rate to reduce the pressure in said combustion chamber below that in the said auxiliary chamber while said injected fuel is burning whereby a jet of air is caused to issue from said auxiliary chamber into said combustion chamber, directing said air jet to cause maximum turbulence and predetermined rate of combustion in said combustion chamber and thereby a rapid rise in pressure sufficient to cause reverse flow of some unburned fuel into said auxiliary chamber wherein said fuel burns and expands and causes a second jet to be projected into said combustion chamber to repeat the described cycle.

FRED. A. THAHELD.

REFERENCES CITED

The following references are of record in the file of this patent:

UNITED STATES PATENTS

| Number | Name | Date |
| --- | --- | --- |
| 1,467,288 | VanArmstel | Sept. 4, 1923 |
| 1,998,978 | Broege | Apr. 23, 1935 |
| 2,157,658 | Fischer | May 9, 1939 |

FOREIGN PATENTS

| Number | Country | Date |
| --- | --- | --- |
| 383,993 | Great Britain | Dec. 1, 1932 |
| 816,107 | France | Apr. 26, 1937 |